June 3, 1969    F. G. MARRUJO ET AL    3,447,809
MECHANICAL SEAL ASSEMBLY
Filed June 7, 1967    Sheet 1 of 2

INVENTORS.
FERNANDO G. MARRUJO
WINFRED J. WIESE
BY John O. Evans, Jr.
ATTORNEY

INVENTORS.
FERNANDO G. MARRUJO
BY WINFRED J. WIESE

John O. Evans, Jr.
ATTORNEY 3,447,809
MECHANICAL SEAL ASSEMBLY
Fernando G. Marrujo, La Habra, and Winfred J. Wiese, Whittier, Calif., assignors to Borg-Warner Corporation, Chicago, Ill., a corporation of Illinois
Filed June 7, 1967, Ser. No. 644,214
Int. Cl. F16j *15/40;* F16l *17/02*
U.S. Cl. 277—27                                                    12 Claims

ABSTRACT OF THE DISCLOSURE

A mechanical seal assembly having a stationary sealing ring on a housing and a cooperating rotary sealing ring on a rotatable shaft for sealing against fluid flow in either direction along the shaft. The sealing rings are balanced to provide desired leakage rates in both directions of fluid flow across the sealing interface. The rings also may move in unison longitudinally of the shaft between limit stops in response to differential fluid pressure, the direction of movement depending upon the direction of the pressure differential.

BACKGROUND OF THE INVENTION

Field of the invention

This invention relates to a mechanical seal assembly, and more particularly to such an assembly for sealing a rotary shaft to a wall member having a shaft opening through which the shaft extends, the wall member being subject to reversal of fluid pressure differential thereacross.

SUMMARY OF THE INVENTION

An object of the invention is to provide a mechanical seal assembly, as aforesaid, which seals against flow of fluid in either direction along the shaft.

Another object is to provide a mechanical seal assembly that includes a pair of relatively rotatable sealing rings that are primarily balanced by action of the fluids which the assembly separates.

Another object is to provide a mechanical seal assembly in which the relatively rotatable sealing rings are translated longitudinally of the shaft into one of two selected positions by action of the fluids on opposite sides of the assembly and in response to the difference in the pressures of the fluids.

The foregoing and other objects and advantages of the invention are realized in a mechanical seal assembly for sealing a rotary shaft to a wall member having a shaft opening through which the shaft extends, the wall member being subject to reversal of fluid pressure differential thereacross, the assembly having a stationary sealing ring carried by the wall member, the ring surrounding the shaft and fixed against rotation with respect to the wall member; a rotary sealing ring carried by and surrounding the shaft, and mounted for rotation therewith; each sealing ring having a front sealing surface, the sealing surfaces being rotatably opposed in mutual sealing relation along a generally radially extending, annular interface having an outer circumference exposed to fluid on one side of the wall member and an inner circumference exposed to fluid on the other side of the wall member, the sealing rings being movable, in unison, axially of the shaft from a first position to a second position and vice versa; means for limiting the axial movement of the sealing rings to movement between the first and second positions; first seal means for slidably sealing the stationary sealing ring to the housing along a first cylindrical surface concentric or coaxial with the shaft and having a radius longer than the inner radius yet shorter than the outer radius of the interface; and second seal means for slidably sealing the rotary sealing ring to the shaft along a second cylindrical surface concentric or coaxial with the shaft and having a radius longer than the inner radius yet shorter than the outer radius of the interface. The assembly further includes the stationary ring having a rear surface including a first, annular surface portion that, in effect, extends radially and that is exposed to fluid on said other side of the wall member, the first surface portion being concentric with the shaft and having an inner radius equal to the inner radius of the interface and an outer radius equal to the radius of the first cylindrical surface; and the stationary ring having a rear surface including a second, annular surface portion that, in effect, extends radially and that is exposed to fluid on said one side of the wall member, the second surface portion being concentric with the shaft and having an inner radius equal to the radius of the first cylindrical surface and an outer radius equal to the outer radius of the interface. Moreover, the assembly includes the rotary sealing ring having a rear surface including a third, annular surface portion that, in effect, extends radially and that is exposed to fluid on said one side of the wall member, the third surface portion being concentric with the shaft and having an inner radius equal to the radius of the second cylindrical surface and an outer radius equal to the outer radius of the interface; and the rotary sealing ring having a rear surface including a fourth, annular surface portion that, in effect, extends radially and that is exposed to fluid on said other side of the wall member, the fourth surface portion being concentric with the shaft and having an inner radius equal to the inner radius of the interface and an outer radius equal to the radius of the second cylindrical surface. Also, the assembly includes the stationary sealing ring being biased towards the rotary sealing ring by the resultant of the fluid forces applied to the first surface portion and the second surface portion of the stationary sealing ring; and the rotary sealing ring being biased towards the stationary sealing ring by the resultant of the fluid forces applied to the third surface portion and the fourth surface portion of the rotary sealing ring.

Usually, the radius of the first cylindrical surface is either longer or shorter than the radius of the second cylindrical surface. In these cases, the sealing rings, as a unit, are biased towards one of the two limiting positions of axial movement of the rings.

Other objects and advantages of the invention are set forth in or will be apparent from the following description of the preferred embodiment shown in the drawings.

DESCRIPTION OF THE PREFERRED EMBODIMENT

Figure 1:
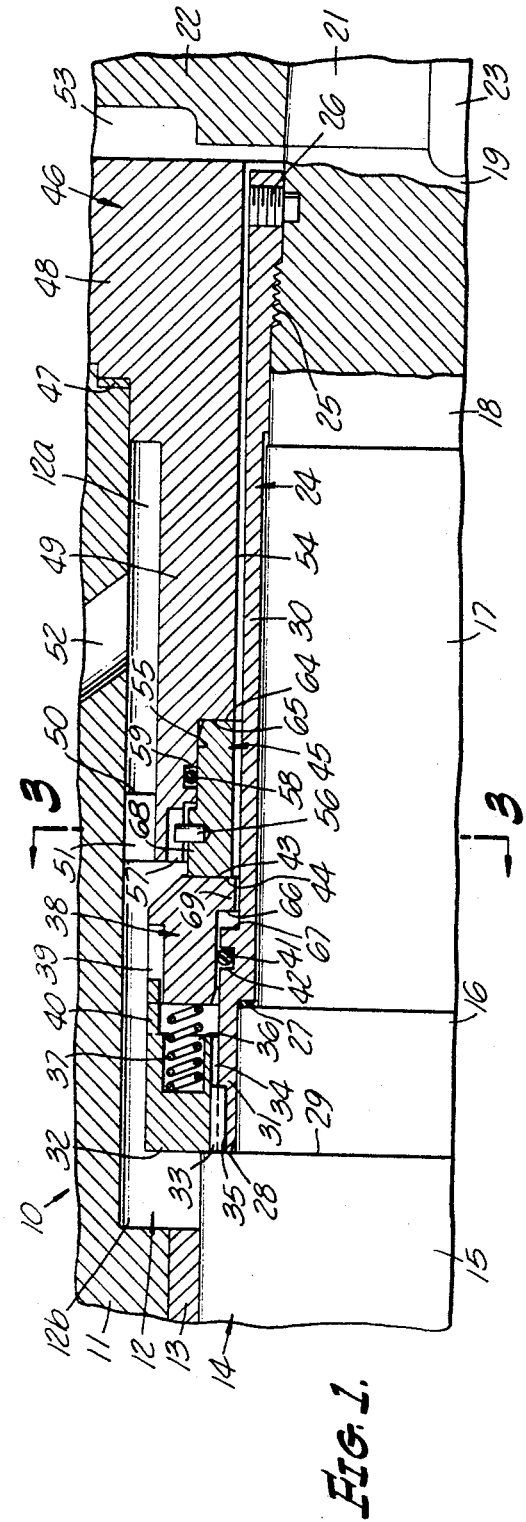
FIG. 1 is a quarter-sectional, axial view of an exemplary, and presently preferred, embodiment of a mechanical seal assembly in accordance with the invention, the view showing the sealing rings in one operative position.

In the several views of the drawings and in the following description, like reference numerals denote corresponding parts.

Figure 2:
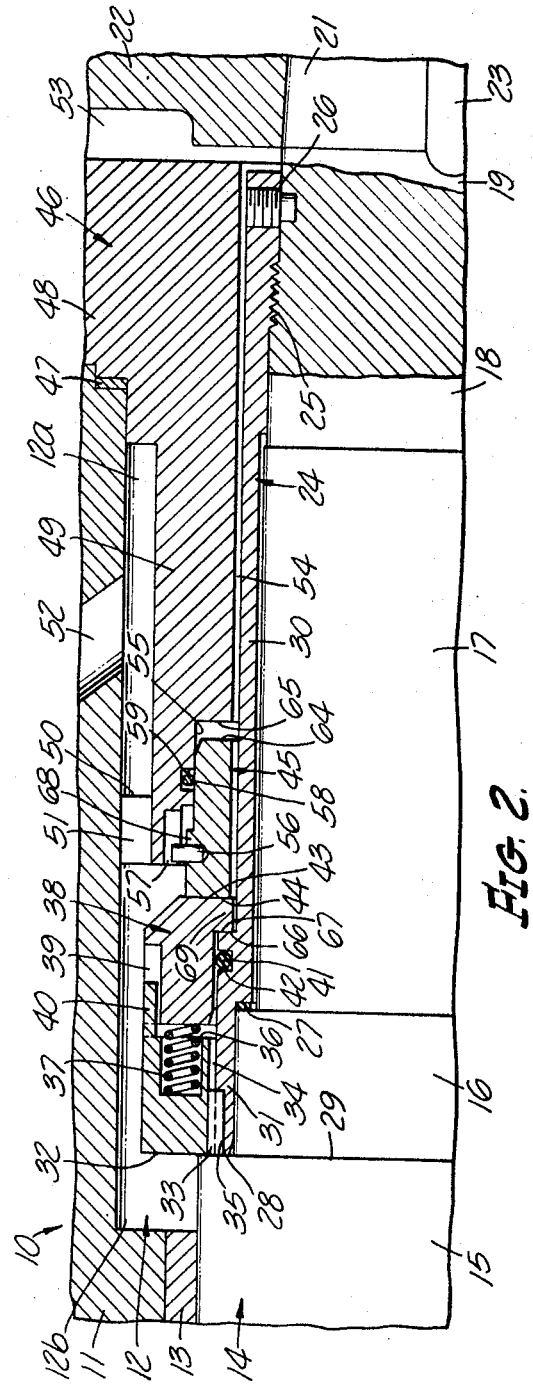
FIG. 2 is an axial, quarter-sectional view of the assembly of FIG. 1 showing the sealing rings in another operative position.
Figure 3:
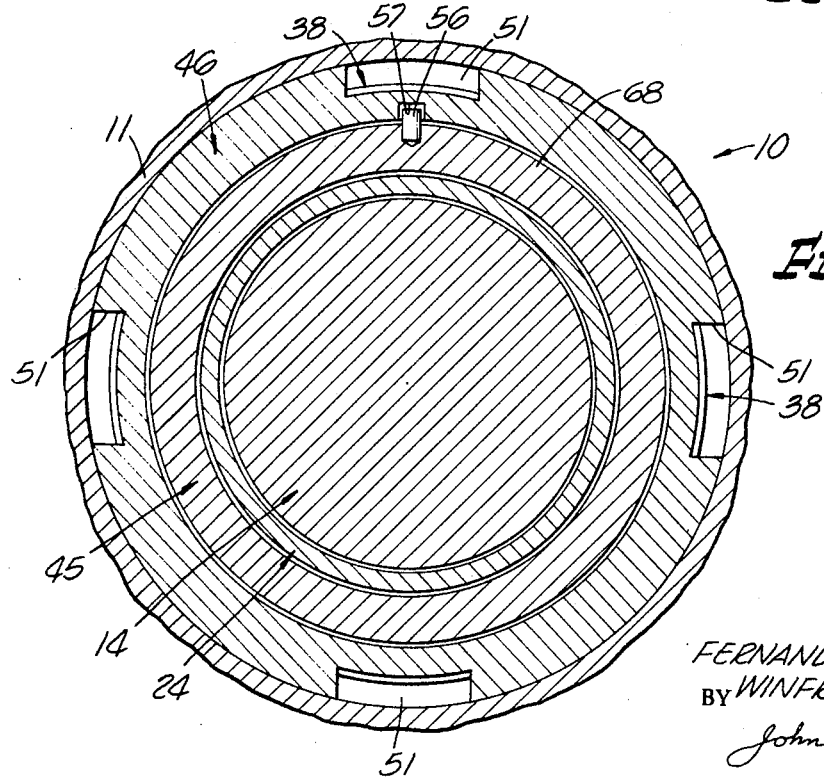
FIG. 3 is a transverse sectional view of the mechanical seal assembly taken along the line 3—3 of FIG. 1 and looking in the direction of the arrows.

Referring to the drawings, particularly to FIGS. 1 to 3, there is shown a housing designated by the general reference numeral 10. The housing has a wall 11 providing a mechanical seal cavity 12. A radial bearing 13 is fitted in an opening in the main wall section and supports a shaft 14 for rotation therein. The shaft has a main portion 15, a first reduced portion 16, a second reduced portion 17, a third reduced portion 18, a fourth reduced portion 19, all of which are cylindrical, and a tapered portion 21. A pump impeller 22 is mounted on the tapered portion of the shaft and drivingly connected to the shaft by a key 23.

A shaft sleeve 24 is threaded on the shaft by mating screw threads 25 and secured against unthreading by a lock screw 26. Fluid flow between the shaft and the sleeve is prevented by a gasket ring 27 pressed between opposed shoulders on the shaft and on the sleeve to provide a static seal. The end 28 of the sleeve firmly abuts the shoulder 29 on the shaft. The shaft sleeve has an elongated section 30 with an outer cylindrical surface, and a short section 31 of somewhat larger outer radius.

Mounted on the short section 31 of the shaft is a driving ring and spring holder 32. The driving ring is rotated by the shaft sleeve through a key 33 fitted into a keyway 34 in the driving ring and into a corresponding slot 35 in the sleeve. The driving ring has a plurality of spring pockets, such as the spring pocket 36, arranged about the ring, each pocket receiving a coil spring 37, one end of which bears against the inner end of the pocket and the other end of which bears against the back of a rotary sealing ring 38. A longitudinal drive slot 39 is provided in the outer periphery of the rotary sealing ring, and a longitudinal driving tang 40, integral with the driving ring 32, is received in the drive slot, whereby the sealing ring is rotated by the drive ring 32, and indirectly by the shaft sleeve 24 and the shaft 14. As will be seen, the rotary sealing ring is free to move axially on the shaft sleeve, and is urged away from the driving ring 32 by the springs 37.

An O-ring seal 41, received in a circumferential groove 42 in the short, larger diameter sleeve section 31, encircles the shaft sleeve and slidably seals the rotary sealing ring 38 to the shaft sleeve. Alternatively, the O-ring seal may be carried in a groove (not shown) in the rotary sealing ring to slidably seal against the outer periphery of the sleeve section 31 which, in this arrangement, will not have the groove 42. Or, the rotary sealing ring may be sealed to the shaft sleeve by any desired means for slidably sealing along a cylindrical surface coaxial with the shaft as the sealing ring moves axially of the shaft. The O-ring seal means prevents flow of fluid in either direction through the clearance space between the rotary sealing ring and the shaft seal.

An annular, radial sealing surface 43, concentric with the shaft, is provided on the front of the rotary sealing ring, which surface sealingly cooperates with an opposed coextensive, annular, radial sealing surface 44 on the front of a stationary sealing ring 45. Each of these cooperating sealing surfaces is accurately machined and lapped to a high polish or mirror-like finish that is nearly perfectly planar; preferably the sealing surfaces are flat within one wave length of monochromatic orange light, as tested by usual optical methods.

The stationary sealing ring 45 is carried by a stationary sealing ring holder 46 fixedly mounted to the housing wall 11. A ring-shaped gasket 47 provides a static seal between the sealing ring holder 46 and the wall 11. The sealing ring holder has a flange 48 that is fastened to the wall 11 as by bolts (not shown); it also has a tubular portion 49 that projects into the mechanical seal cavity 12. A circumferential rib 50 is provided at the free end of the tubular portion 49, which rib contacts the wall 11 to center and support the end of the holder 46. Notches 51 in the periphery of the rib provide openings that intercommunicate the mechanical seal cavity portions 12a and 12b. A bore 52 in the wall 11 provides fluid communication with the seal cavity 12 and with the outer periphery of the sealing interface 43, 44 between the rotary and stationary sealing rings. The inner periphery of the sealing interface 43, 44 is in fluid communication with the impeller cavity 53 through the annular space 54 between the shaft sleeve and the stationary sealing ring 45 with its holder 46.

The stationary sealing ring is carried in a bore 55 in the holder 46 and is axially slidable in the bore. A pin 56 projects from the stationary sealing ring 45 into sliding engagement in a longitudinal slot 57 in the holder to prevent rotation of the sealing ring in the holder. An O-ring 58 slidably seals the stationary sealing ring to the holder along a cylindrical surface coaxial with the shaft. The O-ring is carried in an O-ring groove 59 in the holder 46, but it is evident that, alternatively, the O-ring may be carried in a groove (not shown) in the stationary sealing ring and seal against a cylindrical surface of the holder.

The sealing rings 38 and 45 are made of materials well known in the field of mechanical seals. Usually, the stationary ring is fabricated from a material that is different from the material of the rotary ring. Typically, the stationary ring is made of stainless steel and the rotary ring of carbon. But, of course, other materials suited to the environment may be used instead.

The mechanical seal assembly of this invention may be used in a combined centrifugal pump and electric motor unit to separate a hot liquid being pumped from a liquid lubricant-coolant in the electric motor that drives the pump impeller. The electric motor may be a "canned" motor having a shell which hermetically encloses the stator, the rotor and the shaft bearings, the shell being filled with cool oil under high pressure for cooling and lubricating the motor parts. The pump impeller is driven by an extension of the motor shaft, and the impeller cavity is occupied by a fluid, such as oil, which is being pumped. The oil in the impeller cavity is hot and under a high pressure, although one which is somewhat less than the pressure of the coolant oil in the motor. Thus, the normal tendency is for the oil in the motor to flow along the shaft into the impeller cavity. If, for any reason, the pressure in the motor should become less than the pressure in the impeller cavity, oil from the cavity would tend to flow in the reverse direction, i.e., from the impeller cavity into the motor. As the oil being pumped is hot, it would damage the motor if it were to flow into the motor shell.

The seal assembly of this invention is installed around the shaft between the "canned" motor and the pump to prevent any substantial flow of oil in either direction between the interior of the motor and the impeller cavity of the pump.

Referring to FIGS. 1 and 2, a "canned" motor (not shown) at the left of the views has the interior of its shell in fluid communication with the mechanical seal cavity portion 12b through the slight clearance between the bearing 13 and the shaft 14. The interior of the motor shell is also in communication with the mechanical seal cavity portion 12a through the bore 52 in the wall 11. The wall 11 separates the interior of the motor shell from the impeller cavity 53, the latter being in fluid communication with the inner periphery of the sealing interface 43, 44 through the annular space 54. Thus, the pressure of the oil in the motor shell on one side of the wall 11 is applied to the outer periphery of the seal interface 43, 44, and the pressure of the oil in the impeller cavity on the other side of the wall 11 is applied to the inner periphery of the seal interface.

For reasons which will be explained hereinafter with reference to FIG. 4, the sealing rings are disposed as shown in FIG. 1 when the pressure of the fluid in the seal cavity 12 is either the same as or greater than the pressure of the fluid in the annular space 54. Conversely, when there is a reversal of pressures, and the pressure in the annular space 54 becomes sufficiently higher than the pressure in the seal cavity 12 and overcomes the bias of the springs 37, the sealing rings move to the positions shown in FIG. 2. In either event, any substantial flow of fluid along the shaft from the zone of higher pressure to the zone of lower pressure is precluded.

Figure 4:
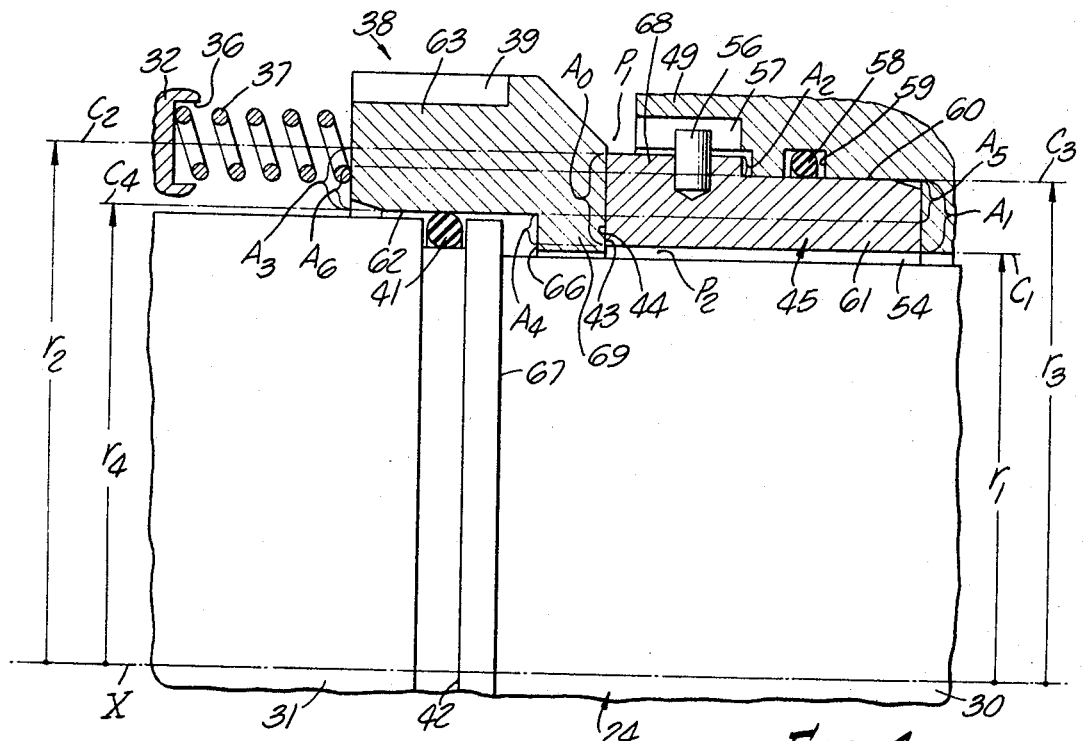
FIG. 4 is a quarter-sectional, fragmentary axial view, on an enlarged scale, of the assembly, the sealing rings being shown in the same operative position as in FIG. 1.

Referring to FIG. 4:

X is a line denoting the axis of the shaft sleeve 24;

$C_1$ denotes an imaginary cylinder having the axis X and a radius $r_1$ equal to the inner radius of the sealing interface 43, 44 of the sealing rings 38 and 45;

$C_2$ denotes another imaginary cylinder having the axis X and a radius $r_2$ equal to the outer radius of the interface 43, 44;

$C_3$ denotes yet another imaginary cylinder having the axis and a radius $r_3$ equal to the radius of the cylindrical surface 60 on the shank 61 of the stationary sealing ring 45, with which surface the O-ring 58 provides a sliding seal; and $C_4$ denotes still another imaginary cylinder having the axis X and a radius $r_4$ equal to the radius of the cylindrical surface 62 on the shank 63 of the rotary sealing ring 38, with which surface the O-ring 41 provides a sliding seal.

$A_0$ denotes the area of the radial, annular sealing interface 43, 44. If the interface is not radial, the area of an axial projection of the interface on a radial plane is the area to be considered.

$A_1$ denotes the area of a portion of the rear surface of the stationary sealing ring 45 defined between the cylinders $C_1$ and $C_3$. Here again, the area to be considered, or the effective area, is the area of an axial projection of the surface portion on a radial plane.

$A_2$ denotes the effective area of another portion of the rear surface of the stationary sealing ring, which portion is defined between the cylinders $C_2$ and $C_3$.

$A_3$ denotes the effective area of a portion of the rear surface of the rotary sealing ring defined between the cylinders $C_2$ and $C_4$.

$A_4$ denotes the effective area of another portion of the rear surface of the rotary sealing ring defined between the cylinders $C_1$ and $C_4$.

$A_5$ denotes the effective area of a portion of the rear surface of the stationary sealing ring 45 defined between the cylinders $C_3$ and $C_4$.

$A_6$ denotes the effective area of a portion of the rear surface of the rotary sealing ring 38 defined between the cylinders $C_3$ and $C_4$.

$P_1$ is the pressure of the fluid to which the outer periphery of the sealing interface 43, 44 is subjected. This fluid is in the chamber 12 and is in contact with certain surfaces of the sealing rings 38 and 45.

$P_2$ is the pressure of the fluid to which the inner periphery of the sealing interface is subjected. This fluid is in the space 54 and is in contact with certain other surfaces of the sealing rings.

In the following discussion of the action of the sealing rings in response to differences in the pressures $P_1$ and $P_2$, radial components of the fluid forces applied to the sealing rings will be ignored, as these components have no effect on the axial movement of the sealing rings. Moreover, except as noted, the effect of the springs 37 will not be considered, as the magnitude of this effect is usually relatively small compared to the magnitude of the axially directed components of the fluid forces acting on the sealing rings.

First, the axial movement of the sealing rings in unison will be considered. As indicated hereinbefore, the sealing rings move between the positions shown in FIG. 1 and those shown in FIG. 2. When $P_1$ is higher than $P_2$, the sealing rings assume the positions shown in FIG. 1, with the rear surface 64 of the shank 61 of the stationary sealing ring in abutment with the surface 65 on the holder 46. These surfaces 64 and 65 serve as complementary stop members for limiting movement of the sealing rings to the right, as seen in FIG. 1. Conversely, when $P_2$ is higher than $P_1$, the sealing rings move to the left and become disposed as shown in FIG. 2, with the surface 66 of the rotary seal ring 38 abutting the shoulder 67 on the shaft sleeve 24. The surface 66 and shoulder 67 act as complementary stop members for limiting movement of the sealing rings to the left, as seen in FIG. 2.

Referring to FIG. 4, the force that moves the sealing rings in unison is the resultant of the axially directed fluid forces applied to $A_5$ and $A_6$. This is apparent from FIG. 4 wherein it is seen that the axial components of force exerted by $P_1$ on the surfaces of the sealing rings 38 and 45 that lie radially outwardly of the cylinder $C_3$ counterbalance one another and, hence, produce a resultant force of zero. Moreover, it is seen that the axial components of force exerted by $P_2$ on the surfaces of the sealing rings that lie radially inwardly of the cylinder $C_4$ also counterbalance each other to produce no resultant force. $P_1$ acts on $A_6$ to provide a force tending to move the two sealing rings to the right, and $P_2$ acts on $A_5$ to provide a force tending to move the two sealing rings to the left. As the areas $A_5$ and $A_6$ are equal, a difference in $P_1$ and $P_2$ will provide a resultant force tending to move the two-sealing-rings system in a direction from left to right, as seen in FIG. 4, if $P_1$ is greater than $P_2$. On the other hand, if $P_2$ is greater than $P_1$, the resultant force will move the two-sealing-rings system from right to left. The magnitude of the resultant force is readily calculated when the areas $A_5$ and $A_6$ and the pressures $P_1$ and $P_2$ are given, the magnitude being equal to the area of $A_5$ or $A_6$ multiplied by the difference between the pressures $P_1$ and $P_2$.

Seal balance will now be considered. In this discussion, the force exerted by the springs 37 and the radial force components exerted on the sealing rings by the fluid will be ignored, as the former is relatively small and the latter have no effect on seal balance.

Referring to FIG. 4, $P_1$ is greater than $P_2$, and the sealing rings 38 and 45 are in the positions shown in the figure. In this case, the rotary sealing ring 38 is axially movable and the stationary sealing ring 45 does not move axially. The force that presses the rotary sealing ring 38 into sealing relation to the stationary sealing ring 45 is equal to $P_1$ times $A_3$ plus $P_2$ times $A_4$. This force is exactly counterbalanced by the axial force exerted on the ring 38 by the film of fluid in the sealing interface 43, 44. Such counterbalancing axial force is equal to $A_0$ times the average pressure of the fluid film in the interface, which average pressure has a value intermediate $P_1$ and $P_2$. It is noted that $A_0$ is equal to $A_3$ plus $A_4$.

In the case of a sealing ring, having a geometry similar to that of the rotary sealing ring 38, the balance of the ring is defined as the ratio of $A_3$ to $A_0$, usually expressed in terms of percent. If $A_3$ is 75% of $A_0$, the ring is said to have a 75% balance. Experience has shown that a sealing ring having a balance of about 75% will meet the requirements of most mechanical seals. With a balance of 75%, the leakage rate that is established across the sealing interface is about optimum to insure proper cooling and lubrication of the sealing faces 43 and 44. Higher percentage balances provide tighter seals, i.e., seals having lower interfacial leakage rates. Lower percentage balances provide looser seals with higher interfacial leakage rates. We have found that the rotary sealing ring should have a balance of from about 50% to about 95%. If the balance is from about 70% to about 90% improved results usually are attained. A balance of about 75% is preferred.

When the pressure $P_2$ is higher than the pressure $P_1$, the stationary ring 45 becomes the axially movable ring. The force urging the ring 45 towards the ring 38 is equal to $P_2$ times $A_1$ plus $P_1$ times $A_2$. The counterbalancing force exerted by the film of fluid in the interface 43, 44 is equal to $A_0$ times the average pressure of the fluid film in the interface, which average pressure is intermediate $P_1$ and $P_2$.

The balance of the ring 45 is the ratio of $A_1$ to $A_0$, expressed in terms of percent. Note that $A_0$ is equal to $A_1$ plus $A_2$.

In general, the balance of a sealing ring is the quotient of the effective area at the back of the ring that is exposed to the fluid at the higher of the two pressures divided by the area of the sealing interface between the two sealing rings and multiplied by 100.

In the mechanical seal assembly of this invention, the balance of the stationary sealing ring 45 should be between about 50% and about 95%, with a narrower preferred range being from about 70% to about 90%. More specifically, a balance of about 75% is desired.

In the mechanical seal assembly shown in the drawings, the balance of the rotary sealing ring 38 is 75%, and that of the stationary sealing ring 45 is 90%. This arrangement gives a tighter seal when the sealing rings are positioned as shown in FIG. 2.

The springs 37 bias the sealing rings 38 and 45 to the right, as seen in FIGS. 1 and 4, into their normal operating positions when there is no pressure drop across the sealing rings. Normally, $P_1$ is greater than $P_2$. When these pressures are applied, the sealing rings are in the correct axial disposition to seal the fluids on opposite sides of the sealing interface. These springs are compressed when there is a reversal in the pressure drop across the sealing rings, that is when $P_1$ becomes less than $P_2$. The compression of the springs cushions the axial movement of the sealing rings from right to left.

The mechanical seal assembly of the invention will function even if the springs are omitted, i.e., the fluid forces alone will cause the sealing assembly to function as described herein.

Referring to FIG. 4, it is seen that $r_3$ is greater than $r_4$. If $r_3$ is made equal to $r_4$, the areas $A_5$ and $A_6$ disappear, and the sealing rings will not move axially and in unison in response solely to fluid pressure differential; however, springs or other means may be used to position the rings axially in this special case. If $r_3$ is made less than $r_4$, axial movement of the sealing rings in unison can occur in response to differential fluid pressure across the rings, but the direction of axial movement will be opposite, in sense, to that of the axial movement which occurs when $r_3$ is greater than $r_4$. In any of these cases, the sealing rings will be balanced in accordance with the invention.

It will be seen that the stationary sealing ring 45 has a front portion that includes a flange 68 that projects radially outwardly of the cylindrical surface 60 of the shank 61. Also, it will be seen that the rotary sealing ring 38 has a front portion that includes a flange 69 that projects radially inwardly of the cylindrical surface 62 on the shank 63. The flange 68 provides the area $A_2$ on its rear surface, and the flange 69 has the area $A_4$ on its rear surface. Also the flanges permit the sealing interface 43, 42 to extend radially outwardly of the cylinder $C_3$ and radially inwardly of the cylinder $C_4$ for the attainment of the desired balance of the sealing rings.

In the light of the foregoing description, various changes and modifications may be made in the illustrative embodiment without departing from the principles of the invention.

The terms right and left are used herein with reference to the orientation of the figures of the drawings and not with reference to the orientation of the mechanical seal assembly itself, which may be disposed in any desired orientation.

We claim:

1. A mechanical seal assembly for sealing a rotary shaft to a wall member having a shaft opening through which the shaft extends, the wall member being subject to reversal of fluid pressure differential thereacross, said assembly comprising:

(a) a stationary sealing ring carried by the wall member, said ring surrounding the shaft and fixed against rotation with respect to the wall member;

(b) a rotary sealing ring carried by and surrounding the shaft, and mounted for rotation therewith;

(c) each said sealing ring having a front sealing surface, said sealing surfaces being rotatably opposed in mutual sealing relation along a generally radially extending, annular interface having an outer circumference exposed to fluid on one side of the wall member and an inner circumference exposed to fluid on the other side of the wall member, said sealing rings being movable, in unison, axially of the shaft from a first position to a second position and vice versa;

(d) means for limiting the axial movement of said sealing rings to movement between said first and second positions;

(e) first seal means for slidably sealing said stationary sealing ring to the housing along a first cylindrical surface concentric with the shaft and having a radius longer than the inner radius yet shorter than the outer radius of said interface;

(f) second seal means for slidably sealing said rotary sealing ring to the shaft along a second cylindrical surface concentric with the shaft and having a radius longer than the inner radius yet shorter than the outer radius of said interface;

(g) said stationary sealing ring having a rear surface including a first, annular surface portion that, in effect, extends radially and that is exposed to fluid on said other side of the wall member, said first surface portion being concentric with the shaft and having an inner radius equal to the inner radius of said interface and an outer radius equal to the radius of said first cylindrical surface;

(h) said stationary sealing ring having a rear surface including a second, annular surface portion that, in effect, extends radially and that is exposed to fluid on said one side of the wall member, said second surface portion being concentric with the shaft and having an inner radius equal to the radius of said first cylindrical surface and an outer radius equal to the outer radius of said interface;

(i) said rotary sealing ring having a rear surface including a third, annual surface portion that, in effect, extends radially and that is exposed to fluid on said one side of the wall member, said third surface portion being concentric with the shaft and having an inner radius equal to the radius of said second cylindrical surface and an outer radius equal to the outer radius of said interface;

(j) said rotary sealing ring having a rear surface including a fourth, annular surface portion that, in effect, extends radially and that is exposed to fluid on said other side of the wall member, said fourth surface portion being concentric with the shaft and having an inner radius equal to the inner radius of said interface and an outer radius equal to the radius of said second cylindrical surface;

(k) said stationary sealing ring being biased towards said rotary sealing ring by the resultant of the fluid forces applied to said first surface portion and said second surface portion of said stationary sealing ring; and (l) said rotary sealing ring being biased towards said stationary sealing ring by the resultant of the fluid forces applied to said third surface portion and said fourth surface portion of said rotary sealing ring.

2. A mechanical seal assembly for sealing a rotary shaft to a wall member having a shaft opening through which the shaft extends, the wall member being subject to reversal of fluid pressure differential thereacross, said assembly comprising:

(a) a stationary sealing ring carried by the wall member, said ring surrounding the shaft and fixed against rotation with respect to the wall member;

(b) a rotary sealing ring carried by and surrounding the shaft, and mounted for rotation therewith;

(c) each said sealing ring having a front sealing surface, said sealing surfaces being rotatably opposed in mutual sealing relation along a generally radially extending, annular interface having an outer circumference exposed to fluid on one side of the wall member and an inner circumference exposed to fluid on the other side of the wall member, said sealing rings being movable, in unison, axially of the shaft from a first position to a second position and vice versa;

(d) means for limiting the axial movement of said sealing rings to movement between said first and second positions;

(e) first seal means for slidably sealing said stationary sealing ring to the housing along a first cylindrical surface concentric with the shaft and having a radius longer than the inner radius yet shorter than the outer radius of said interface;

(f) second seal means for slidably sealing said rotary sealing ring to the shaft along a second cylindrical surface concentric with the shaft and having a radius longer than the inner radius yet shorter than the outer radius of said interface;

(g) the radius of said first cylindrical surface being greater than the radius of said second cylindrical surface;

(h) said stationary sealing ring having a rear surface including a first, annular surface portion that, in effect, extends radially and that is exposed to fluid on said other side of the wall member, said first surface portion being concentric with the shaft and having an inner radius equal to the inner radius of said interface and an outer radius equal to the radius of said first cylindrical surface;

(i) said stationary sealing ring having a rear surface including a second, annular surface portion that, in effect, extends radially and that is exposed to fluid on said one side of the wall member, said second surface portion being concentric with the shaft and having an inner radius equal to the radius of said first cylindrical surface and an outer radius equal to the outer radius of said interface;

(j) said rotary sealing ring having a rear surface including a third, annular surface portion that, in effect, extends radially and that is exposed to fluid on said one side of the wall member, said third surface portion being concentric with the shaft and having an inner radius equal to the radius of said second cylindrical surface and an outer radius equal to the outer radius of said interface;

(k) said rotary sealing ring having a rear surface including a fourth, annular surface portion that, in effect, extends radially and that is exposed to fluid on said other side of the wall member, said fourth surface portion being concentric with the shaft and having an inner radius equal to the inner radius of said interface and an outer radius equal to the radius of said second cylindrical surface;

(l) said stationary sealing ring being biased towards said rotary sealing ring by the resultant of the fluid forces applied to said first surface portion and said second surface portion of said stationary sealing ring;

(m) said rotary sealing ring being biased towards said stationary sealing ring by the resultant of the fluid forces applied to said third surface portion and said fourth surface portion of said rotary sealing ring;

(n) said stationary sealing ring having on its rear surface a fifth, annular surface portion that, in effect, extends radially and that is exposed to fluid on said other side of the wall member, said fith surface portion being concentric with the shaft and having an inner radius equal to the radius of said second cylindrical surface and an outer radius equal to the radius of said first cylindrical surface;

(o) said rotary sealing ring having on its rear surface a sixth, annular surface portion that, in effect, extends radially and that is exposed to fluid on said one side of the wall member, said sixth surface portion being concentric with the shaft and having an inner radius equal to the radius of said second cylindrical surface and an outer radius equal to the radius of said first cylindrical surface; and (p) said sealing rings, as a unit, being biased towards one of said positions by the resultant of the fluid forces applied to said fifth surface portion and said sixth surface portion.

3. A mechanical seal assembly as defined in claim 2 wherein the effective area of said first surface portion is from about 50% to about 95% of the effective area of said interface, and the effective area of said third surface portion is from about 50% to about 95% of the effective area of said interface.

4. A mechanical seal assembly as defined in claim 2 wherein the effective area of said first surface portion is from about 70% to about 90% of the effective area of said interface, and the effective area of said third surface portion is from about 70% to about 90% of the effective area of said interface.

5. A mechanical seal assembly as defined in claim 2 wherein the effective area of said first surface portion is about 75% of the eeffctive area of said interface, and the effective area of said third surface portion is about 75% of the effective area of said interface.

6. A mechanical seal assembly as defined in claim 2 including resilient means for biasing said sealing rings, as a unit, towards one of said positions.

7. A mechanical seal assembly for sealing a rotary shaft to a wall member having a shaft opening through which the shaft extends, the wall member being subject to reversal of fluid pressure differential thereacross, said assembly comprising:

(a) a stationary sealing ring carried by the wall member, said ring surrounding the shaft and spaced therefrom, and fixed against rotation with respect to the wall member, said ring having a shank portion with a cylindrical outer surface coaxial with the shaft and a front portion including a flange projecting outwardly of said cylindrical surface, said ring being movable axially in the wall member;

(b) a first O-ring seal carried by the wall member for slidably sealing said ring to the wall member along said cylindrical outer surface;

(c) a rotary sealing ring carried by and surrounding the shaft, and mounted for rotation therewith, said rotary sealing ring having a shank portion with a cylindrical inner surface coaxial with the shaft and a front portion including a flange projecting inwardly of said cylindrical inner surface, said rotary sealing ring being movable axially on the shaft;

(d) a second O-ring seal carried by the shaft for slidably sealing said rotary sealing ring to the shaft along said cylindrical inner surface;

(e) the radius of said cylindrical outer surface being longer than the radius of said cylindrical inner surface;

(f) each said sealing ring having a sealing surface on its front portion, said sealing surfaces being rotatably opposed in mutual sealing relation along a generally radially extending, annular interface having an outer circumference exposed to fluid on one side of the wall member and an inner circumference exposed to fluid on the other side of the wall member, the outer radius of said interface being longer than the radius of said cylindrical outer surface and the inner radius of said interface being shorter than the radius of said inner cylindrical surface, said sealing rings being axially movable in unison;

(g) a stop member on said rotary sealing ring and a cooperating stop member on the shaft for limiting movement of said sealing rings in one direction, and another stop member on said stationary sealing ring and another cooperating stop member on the wall member for limiting movement of said sealing rings in the opposite direction;

(h) said shank portion of said stationary sealing ring having a rear surface including a first, annular surface portion that, in effect, extends radially and that is exposed to fluid on said other side of the wall member, said first surface portion being concentric with the shaft and having an inner radius equal to the inner radius of said interface and an outer radius equal to the radius of said cylindrical outer surface;

(i) said flange of said front portion of said stationary sealing ring having a rear surface including a second, annular surface portion that, in effect, extends radially and that is exposed to fluid on said one side of the wall member, said second surface portion being concentric with the shaft and having an inner radius equal to the radius of said cylindrical outer surface and an outer radius equal to the outer radius of said interface;

(j) said shank portion of said rotary sealing ring having a rear surface including a third, annular surface portion that, in effect, extends radially and that is exposed to fluid on said one side of the wall member, said third surface portion being concentric with the shaft and having an inner radius equal to the radius of said cylindrical inner surface and an outer radius equal to the outer radius of said interface;

(k) said flange of said front portion of said rotary sealing ring having a rear surface including a fourth, annular surface portion that, in effect, extends radially and that is exposed to fluid on said other side of the wall member, said fourth surface portion being concentric with the shaft and having an inner radius equal to the inner radius of said interface and an outer radius equal to the radius of said cylindrical inner surface;

(l) said stationary sealing ring being biased towards said rotary sealing ring by the resultant of the fluid forces applied to said first surface portion and said second surface portion of said stationary sealing ring;

(m) said rotary sealing ring being biased towards said stationary sealing ring by the resultant of the fluid forces applied to said third surface portion and said fourth surface portion of said rotary sealing ring;

(n) said shank portion of said stationary sealing ring having on its rear surface a fifth, annular surface portion that, in effect, extends radially and that is exposed to fluid on said other side of the wall member, said fifth surface portion being concentric with the shaft and having an inner radius equal to the radius of said cylindrical inner surface and an outer radius equal to the radius of said cylindrical outer surface;

(o) said shank portion of said rotary sealing ring having on its rear surface a sixth, annular surface portion that, in effect, extends radially and that is exposed to fluid on said one side of the wall member, said sixth surface portion being concentric with the shaft and having an inner radius equal to the radius of said cylindrical inner surface and an outer radius equal to the radius of said cylindrical outer surface; and (p) said sealing rings, as a unit, being biased towards engagement of one of said stop members with its cooperating stop member by the resultant of the fluid forces applied to said fifth surface portion and said sixth surface portion.

8. A mechanical seal assembly as defined in claim 7 wherein the effective area of said first surface portion is from about 50% to about 95% of the effective area of said interface, and the effective area of said third surface portion is from about 50% to about 95% of the effective area of said interface.

9. A mechanical seal assembly as defined in claim 7 wherein the effective area of said first surface portion is from about 70% to about 90% of the effective area of said interface, and the effective area of said third surface portion is from about 70% to about 90% of the effective area of said interface.

10. A mechanical seal assembly as defined in claim 7 wherein the effective area of said first surface portion is about 75% of the effective area of said interface, and the effective area of said third surface portion is about 75% of the effective area of said interface.

11. A mechanical seal assembly as defined in claim 7 wherein said stop member on said rotary sealing ring includes an annular area on said rear surface of said flange of said front portion of said rotary sealing ring, and said cooperating stop member on the shaft includes a shoulder adapted to abut said annular area.

12. A mechanical seal assembly as defined in claim 7 wherein said another stop member on said stationary sealing ring includes an annular area on said rear surface of said shank portion of said stationary sealing ring, and said another cooperating stop member on the wall member includes a shoulder on the wall member adapted to abut said annular area.

References Cited

UNITED STATES PATENTS

| 2,007,414 | 7/1935 | Weis et al. | 277—27 |
| 2,087,313 | 7/1937 | Bigelow et al. | 277—27 |
| 3,006,667 | 10/1961 | Stephens | 277—27 |
| 3,024,027 | 3/1962 | Kubiak | 277—27 |
| 3,330,565 | 7/1967 | Lymer | 277—91 |

FOREIGN PATENTS 1,095,603  12/1960  Germany.

SAMUEL ROTHBERG, *Primary Examiner.*